United States Patent [19]

Parquet

[11] 3,924,650
[45] Dec. 9, 1975

[54] FLUID FLOW DIVIDER VALVE

[75] Inventor: Donald J. Parquet, Burlington, Iowa

[73] Assignee: J. I. Case Company, Racine, Wis.

[22] Filed: June 20, 1974

[21] Appl. No.: 481,191

[52] U.S. Cl. ................................. 137/101; 137/118
[51] Int. Cl.² ......................................... G05D 11/02
[58] Field of Search .......... 137/101, 115, 118, 100; 91/413

[56] References Cited
UNITED STATES PATENTS

| | | | |
|---|---|---|---|
| 2,386,291 | 10/1945 | Browne | 137/101 |
| 2,423,264 | 7/1947 | Stephens | 137/101 |
| 2,466,485 | 4/1949 | Schultz | 137/101 |
| 2,593,185 | 4/1952 | Renick | 137/101 |
| 2,971,522 | 2/1961 | Lewis | 137/101 |
| 3,060,953 | 10/1962 | Harbidge | 137/115 |
| 3,370,602 | 2/1968 | Nelson | 137/101 |
| 3,437,103 | 4/1969 | Yoshino | 137/101 |
| 3,554,213 | 1/1971 | Yoshino | 137/101 |
| 3,590,844 | 7/1971 | Ladenzon | 137/101 |
| 3,722,524 | 3/1973 | Engelmann | 137/101 |

*Primary Examiner*—Martin P. Schwadron
*Assistant Examiner*—George L. Walton
*Attorney, Agent, or Firm*—Arthur J. Hansmann

[57] ABSTRACT

A fluid flow divider valve with a valve body having inlet and outlet openings and a spool shiftable in the valve body for regulating flow through the outlet openings. A fluid by-pass passageway exists in the spool for permitting fluid to pass to the outlet opening when the spool is shifted to an extreme position which would otherwise close off the outlet opening, but instead the by-pass passageway permits fluid to flow through the opening. Compression springs are disposed at opposite ends of the spool for centering the spool relative to the valve body.

6 Claims, 3 Drawing Figures

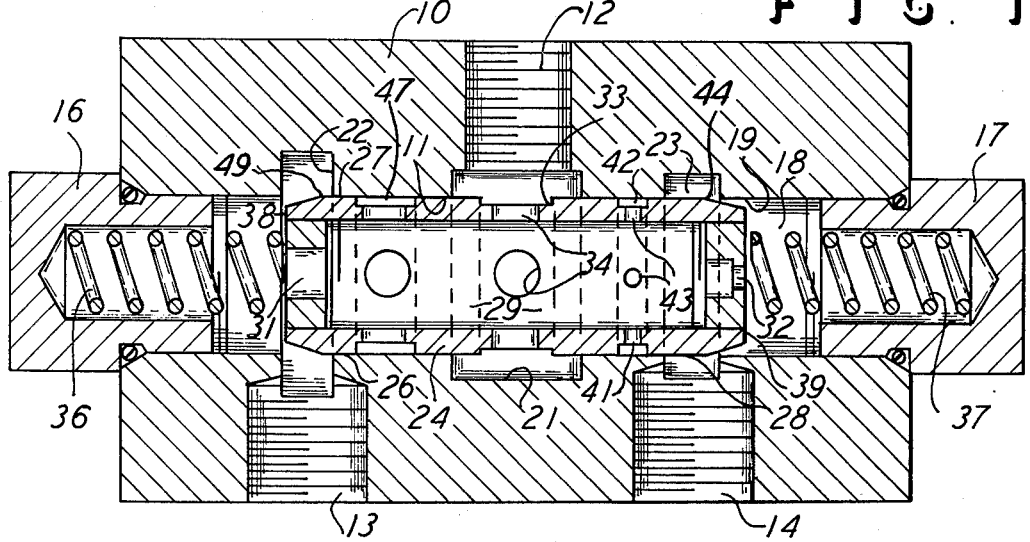
FIG. 1
FIG. 2
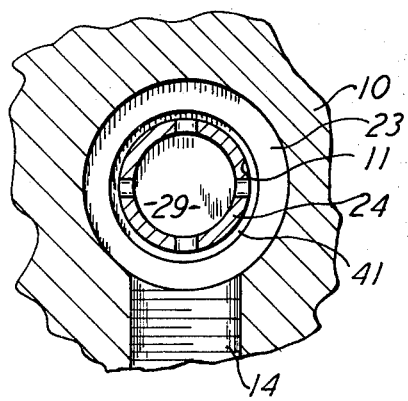
FIG. 3

FLUID FLOW DIVIDER VALVE

This invention relates to a fluid flow divider valve of the type having a spool shiftable in the valve body for regulating the flow of fluid through the valve outlets in proportion to and according to the position of the shiftable spool.

BACKGROUND OF THE INVENTION

Fluid flow divider valves exist in the prior art in many different forms. These valves are commonly used for proportioning the flow of fluid to multiple outlets which are fed by one inlet opening. With these valves, different and various devices and mechanisms can be operated by the fluid flowing from the divider valve, and such flow is commonly proportioned and regulated according to the demands of the devices being powered by the fluid flowing from the valve. Examples of these flow divider valves are found in U.S. Pat. Nos. 3,200,830 and 3,370,602. In these examples, a valve spool is axially shiftable for dividing the flow between multiple outlets in the valve body.

Therefore, conventional flow dividers are commonly provided for the purpose of dividing the incoming flow into two outlet paths for two functions. These prior art devices will proportion or divide the outlet flow with reasonable accuracy, even though the restriction in either outlet line downstream from the flow divider varies either individually or in conjunction with the other line. However, when the spool shifts to maintain the proper division of flow, it restricts the low pressure outlet side while it opens the high pressure outlet side, and if this restriction is great enough, fluid pressure upstream from the flow divider will rise to a level where a relief valve will be tripped or the system will be damaged. Further, during this undesirable increase in upstream pressure, the flow of fluid to the low pressure outlet will diminish to an unacceptable amount which is far below the desired quantity and can be to the point of actually shutting off. For instance, if one of the flow divider outlet lines supplies a fluid cylinder and the other line supplies a fluid motor, the fluid cylinder line can rise to a maximum pressure when the cylinder reaches the end of its travel, and that maximum fluid pressure can cause the spool to shift to where it will close off the fluid motor line, though it is still desired that the fluid motor line receive fluid. This of course is an undesirable consequence of a flow divider valve.

The present invention improves upon the prior art flow dividers in that provision is made for avoiding a undue restriction or shutoff of either of the outlets of the flow divider valve. Accordingly, it is the primary object of this invention to accomplish that improvement in flow divider valves and to thereby improve upon the prior art valves described above. In accomplishing this objective, the flow divider valve of this invention is arranged so that the fluid outlets are never fully restricted and they therefore always have provision for some flow of fluid to all branches of the divider valve. Accordingly, all of the fluid responsive units which are being supplied by fluid from the valve will always have some fluid flowing thereto for acceptable operation of those devices.

Specifically, the flow divider valve of this invention is arranged with a fluid by-pass passageway whereby the spool of the valve can shift to an extreme position for diverting most of the flow to one of the fluid outlets of the valve, but the other fluid outlet of the valve will also still be supplied with fluid passing through the by-pass passageway and will not be starved for fluid.

Still further, in accomplishing the aforementioned objective, the flow divider valve of this invention is calculated to have the division of flow at acceptable and desirable levels though the spool is shifted under maximum pressure.

This flow arrangement can be calculated fairly closely, knowing the outlet flow requirements and the power input source and the downstream conditions. Accordingly, the flow divider valve of this invention will provide a by-pass flow of fluid in the one of the fluid outlet lines with a low pressure and when an excessive restriction exists in the other of the fluid outlet lines. In that instance, the entire fluid supply will then be available to the outlet line with the low pressure, and this is particularly important when it is necessary to be able to continue operating the device connected to the low pressure line. For instance, it is desirable that a fluid motor connected to the low pressure line continue to be fed and operated even though the high pressure line, (which may be feeding a fluid cylinder which creates the high pressure by reaching the end of its travel) is creating the excessive pressure and tending to close off the supply to the hydraulic motor on the low pressure side. With the present invention, the low pressure side cannot be closed off.

Other objects and advantages of this invention include the provision of a fluid flow divider valve which can be easily and economically manufactured, which is efficient in its operation, and which is simple in its structure, and which is reliable and accurate in dividing the flow and in also preventing any undue restriction in the low pressure side, as mentioned above.

BRIEF DESCRIPTION OF THE DRAWINGS

FIG. 1 is a longitudinal sectional view through an embodiment of a fluid flow divider valve made according to this invention.

FIG. 2 is a view similar to FIG. 1, but with the spool shifted to the right from the position shown in FIG. 1.

FIG. 3 is a sectional view taken along the line 3—3 of FIG. 2.

DETAILED DESCRIPTION OF THE PREFERRED EMBODIMENT

The drawings show the flow divider valve of this invention to include the valve body 10 having a centrally located valve chamber 11 and having a fluid inlet opening 12 and two fluid outlet openings 13 and 14, with the inlet and outlet openings being in flow communication with the central chamber 11. The chamber 11 is cylindrically shaped and extends between end plugs 16 and 17 which are threaded into the opposite ends of the valve body 10 to be fluid tight therewith, as shown. Thus the chamber 11 is a cylindrically-shaped bore designated 18 and defined by a cylindrically-shaped wall designated 19 which extends between the plugs 16 and 17.

The inlet opening 12 is in flow communication with an annular groove 21 formed in the body 10 and encircling the cylindrical bore 18. Also, the outlet openings 13 and 14 are respectively in fluid flow communication with annular grooves 22 and 23 which are formed in the body 10 and which encircle the cylindrical bore 18 and are thus formed as grooves in the cylindrical wall 19, as shown. It will be further seen that the outlets 13 and 14, and their respective grooves 22 and 23, are spaced apart but are not equally spaced from the inlet opening 12.

A cylindrically-shaped spool 24 is slidably disposed in the bore 18 and is in contact with the cylindrical wall 19 at the outer circumference 26 of the spool 24, and thus the spool 24 is fluid tight with the cylindrical wall 19 where the spool 24 is in sliding contact with the wall 19, as shown. Therefore, the spool 24 is elongated and can slide or shift axially of the bore 18, and the end lengths 27 and 28 of the spool 24 extend adjacent the outlet grooves 22 and 23, respectively. The spool 24 also has a hollow center or central opening designated 29, and this opening extends between the openings 31 and 32 on opposite ends of the spool 24. Also, the spool 24 has an exterior circular groove 33 extending around the mid-section thereof, and openings 34 extend into the spool 24 to fluid flow communicate between the exterior groove 33 and the interior opening 29.

Accordingly, fluid can enter the inlet opening 12 and it will flow to the valve body groove 21 and thus to the spool groove 33 and then through the openings 34 and into the spool center opening 29. From the location, the fluid can flow through the spool ends 31 and/or 32 and then to the outlet grooves 22 and/or 23 and finally to the outlet openings 13 and/or 14. In this manner, fluid is divided between the outlets 13 and 14, according to the pressures and requirements of the devices connected to the outlets 13 and 14 in any conventional manner and as stated at the outset.

Further, compression springs 36 and 37 are disposed in the valve body and are shown to be actually confined in recesses in the respective plugs 16 and 17, and the springs extend in a free length to be slightly clear of the end walls 38 and 39, respectively, of the spool 24. The springs 36 and 37 are available for positioning the spool 24 in the position shown in FIG. 1, and this is the centered or normal position for the spool 24, in this instance.

With the description given above, and assuming that the outlet 13 is under a higher pressure than the outlet 14, according to the demands of the particular fluid devices connected respectively to each of the outlets 13 and 14, the spool 24 will shift to the right in response to the higher pressure acting on the left end of the spool 24. In that shifted condition of the spool 24, lesser fluid flow will go to the outlet 14, and in fact the spool 24 could shift to a point where outlet 14 would be completely closed off, except for the arrangement hereinafter described. To avoid closing of the outlet 14, a fluid by-pass passageway 41 is provided in the spool 24, and this passageway consists of an annular groove 42 extending around the outer circumference 26 of the spool 24, and it also includes the holes 43 extending through the outer wall in the spool 24 and flow communicating the spool interior 29 to the spool outer groove 42. That is, FIG. 2 shows the spool 24 shifted to the right from the position of FIG. 1, such that the by-pass passageway 41 is in flow communication with the outlet groove 23, and thus the outlet 14 is not completely closed off and therefore fluid is still available through the outlet 14, as desired. It will therefore be noted that the spool end length 28, that is the length from the groove 42 and to the location designated 44 on the spool 24 is such that the end length 28 cannot completely block the flow through the outlet groove 23, and thus that end length 28 is no greater than the axial length of the groove 23.

The left end of the spool 24, as viewed in the drawings, is arranged similar to the right end just described, such that the left end has a fluid by-pass passageway 46 which consists of the outer groove 47 and the holes 48 extending from the groove 47 and into flow communication with the spool interior 29. Here also, the spool end length 27, which extends from the groove 47 and to the location designated 49 on the outer circumference of the spool 24, is of a length no greater than the axial length of the outlet groove 22, and thus the spool end length 27, by virtue of the by-pass 46 cannot close off the outlet opening 22, in the event the spool were to shift to the left as viewed in the drawings, though the spool will meter the flow.

FIG. 3 shows that the grooves 23 and 42 are endless annular grooves, and grooves 22 and 47 are also endless annular grooves. Also, the spool end lengths 27 and 28 are those cylindrical portions which are fluid tight with the cylindrical wall 19 defining the bore 18, and thus the by-pass grooves 42 and 47 are contiguous to those respective end portions 28 and 27. Still further, the springs 36 and 37 have free lengths when the spool is in the FIG. 1 position, and thus the spool and the fluid outlets and the fluid by-pass passageways, along with the springs 36 and 37, can be calculated to achieve the flow conditions desired. Further, the valve could be arranged so that only one by-pass passageway 41 or 46 be provided, and that one would then be disposed on the at least normally low pressure side of the flow divider valve, to preclude the full shutoff of the flow of fluid to that low pressure side, as being described herein. Thd drawings also show that the ends of the spool 24 are provided with caps 51 and 52 which are threaded into the spool 24 as parts thereof, and the openings 31 and 32 are of different sizes, and these different sizes may accommodate different quantities of flow to the respective outlets. Likewise, the fluid by-passes 41 and 46 are of different sizes, for accommodating different quantities of flow, as desired. The grooves 42 and 47, and fluid-tight ends 27 and 28, are all located to avoid complete shutoff in all spool positions.

What is claimed is:

1. A fluid flow divider valve comprising a valve body having a cylindrically-shaped bore defined by a cylindrical wall extending in said body, said body having a fluid inlet opening therein and having two fluid outlet openings in fluid-flow communication with said bore and extending to intersect said cylindrical wall, a one-piece cylindrically-shaped spool snugly disposed in said bore and being axially shiftable along the longitudinal axis of said bore and across said body fluid outlet openings whereby alternate axial shifting of said spool respectively alternately opens and reduces said body fluid outlet openings to the flow of fluid through said body fluid outlet openings, said body fluid outlet openings being located at axially opposite ends of said spool and within the axial extent of said spool when said spool is axially shifted toward either of said body fluid outlet openings, an end length of at least one of the axially opposite ends of said spool having its outer circumference in fluid-tight relation with said cylindrical wall which is contiguous to the respective one of the said body fluid outlet openings when said spool is axially shifted toward its said one end, said spool having a fluid passageway always in fluid-flow communication with said body fluid inlet opening and extending intermediate of said body fluid inlet opening and said one of the said body fluid outlet openings and extending to said end length on said spool and into fluid-flow communication with said one of the said body fluid outlet openings, and said spool end length having a fluid by-pass passageway therein and in fluid-flow communication with the first said fluid passageway and extending exteriorly of said spool to flow communicate with said one of said body fluid outlet openings when said spool is axially shifted toward said one of the said body fluid outlet openings and thereby by-pass fluid from said body fluid inlet opening to said one of the said body fluid outlet openings.

2. The fluid flow divider valve as claimed in claim 1, wherein said spool has an end length at each opposite end thereof and with said end lengths being in fluid-tight relation with said cylindrical wall at locations contiguous to each respective one of said body fluid outlet openings, and said spool having two of its said fluid passageways extending to each respective one of said end lengths of said spool for passing and by-passing fluid to each of said body fluid outlet openings.

3. The fluid flow divider valve as claimed in claim 2, wherein said fluid by-pass passageways extend to outer circumference of said spool and contiguous to respective said end lengths for respective flow communicating with said body fluid outlet openings when said spool is shifted to alternately have said end lengths positioned at least partly beyond respective said body fluid outlet openings.

4. The fluid flow divider valve as claimed in claim 1, wherein said fluid by-pass passageway extends to said outer circumference of said spool and contiguous to said end length for flow communicating with said one of said body fluid outlet openings when said spool is axially shifted to have said end length positioned at least partly beyond said one of the said body fluid outlet openings.

5. The fluid flow divider valve as claimed in claim 1, wherein said valve body has an annular groove extending in said cylindrical wall and in fluid-flow communication with said one of the said body fluid outlet openings and said fluid by-pass passageway including an annular groove extending around the outer circumference of said spool for overlapping positioning with said body annular groove in the axial movement of said spool.

6. The fluid flow divider valve as claimed in claim 1, wherein said spool is of an axial length less than the axial length of said body bore, and including a compression spring in each axial end of said bore and extending free of any forceful contact which forces on said spool, in one position of said spool, to thereby have said springs in a free length condition when said spool is in said one position.

* * * * *